United States Patent Office 2,698,914
Patented Jan. 4, 1955

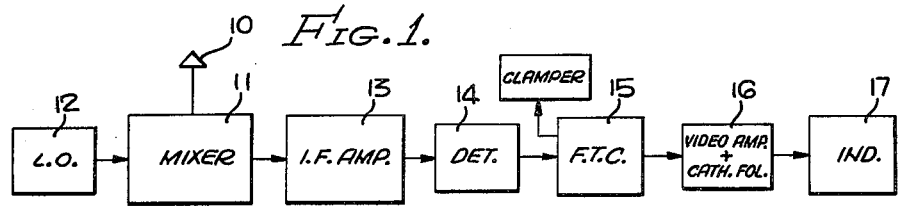
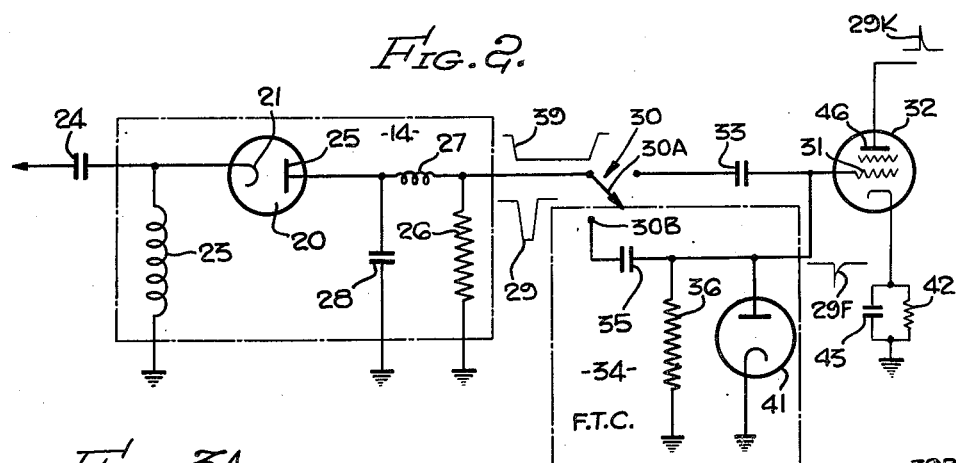
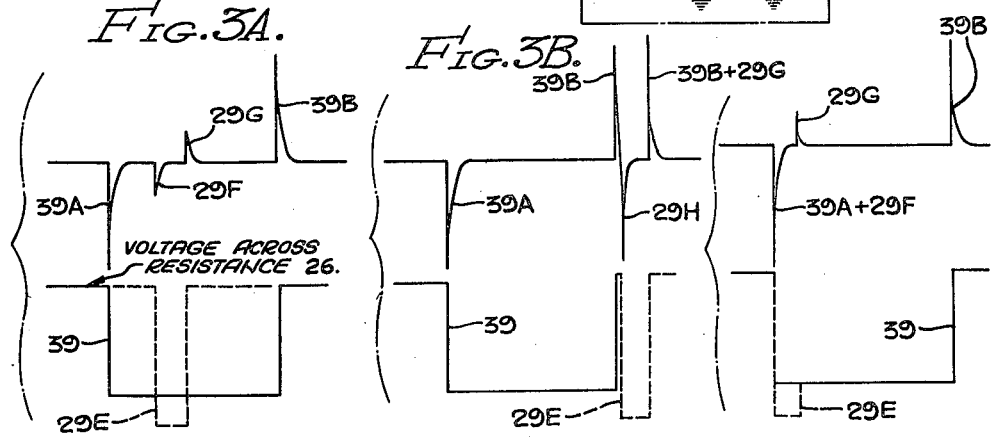
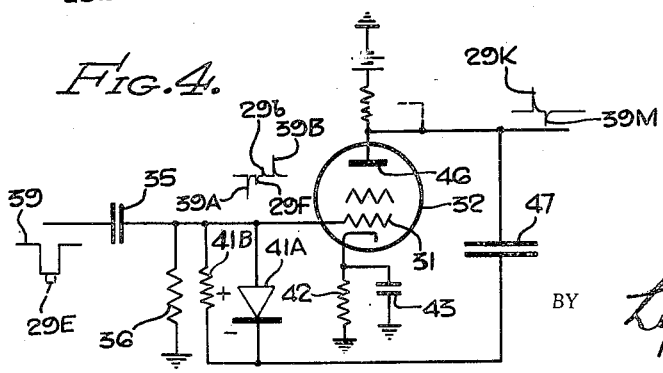

2,698,914

FAST TIME CONSTANT CIRCUIT WITH CLIPPING DIODE

Robert M. Tryon, Lynwood, Calif., assignor to Gilfillan Bros., Inc., Los Angeles, Calif., a corporation of California Application August 28, 1950, Serial No. 181,729

6 Claims. (Cl. 315—30)

The present invention relates to circuitry for selectively distinguishing pulses of predetermined duration, and for preventing the loss of a weak desired received signal which otherwise may be lost in the "shadow" of a strong received preceding signal, and, further, to an improved pulse clipping circuit useful in such circuitry.

The present invention is particularly useful in radar receivers which serve to receive echoes and to indicate the same visually or otherwise. It has been observed that sporadic signals may interfere with the desired signals, such desired signals being echoes reflected from moving or stationary bodies, the presence and position of which is desired to be ascertained. Such sporadic signals with which the present invention is concerned are of relatively long duration with respect to the duration of the desired received echo signal, and are termed in the art "rain clutter" or "cloud clutter." Usually, in conventional radar systems, a cathode ray tube is employed to visually indicate these desired echo signals by causing the intensity of the cathode ray beam to momentarily increase. However, such sporadic signals are of the same polarity as the desired echo signals and likewise are effective to intensify the cathode ray beam, but for a longer period of time since such sporadic signals usually have a longer duration. Other disturbing factors reside in the fact that such sporadic signals may vary both in amplitude and in "phase" with respect to the closely controlled rate of generation of the transmitted radar pulse and resulting echoes.

Similarly, it has been observed that large intensity echoes, as for example, from mountains, which are received on the scanning antenna immediately preceding the reception of the desired signals, serve to strongly reduce the sensitivity of the receiving system for a time interval during which a "shadow" is produced and during which such desired signal is not detected, visually or otherwise. Such condition may result, for example, from the fact that the interstage coupling condensers become charged to a relatively high voltage as a result of such large intensity echoes, and an appreciable time interval is required for such voltage to be dissipated, during which time intervals the receiving system is not sufficiently sensitive or in a condition for satisfactory reception of the small desired echoes.

The present invention has therefore as its main object the provision of a novel method and means whereby the effects of such sporadic signals in the form of rain or cloud clutter or the effects resulting from large intensity echoes may be eliminated in radar receiving systems.

Another object of the present invention is to provide an improved technique involving the use of a fast time constant circuit connected after the detector stage in a radar receiver, such circuit having a time constant commensurate with the duration of the desired received echo signals, to thereby differentiate each of the sporadic signals of relatively long duration or large intensity signals to transform the same into two peaked signals of relatively short duration, whereby the effect of such sporadic and large intensity signals on the associated cathode ray tube is not so prolonged as it otherwise would be.

A subsidiary object of the present invention is to allow an observer of the cathode ray tube in such radar receiving system to clearly distinguish between the desired echo signals and the other signals by switching the fast time constant circuit mentioned in the preceding object in and out of the receiver circuit.

Another general object of the present invention is to enable an observer of a cathode ray tube in a radar receiving system to change the response characteristics of the receiver to other signals of long duration or large intensity which might produce a large area of light on the cathode ray indicator tube.

A further object of the present invention is to provide an improved technique in radar receivers whereby other signals of relatively long time duration or intensity with respect to the duration of received desired echo signals and of the same polarity are each first differentiated in a circuit of time constant commensurate with the duration of the desired echo signals to transform each of such other signals into peaked signals of opposite polarity, and then eliminating that peaked signal which has a polarity opposite from that of the desired echo signals.

A specific object of the present invention is to provide an improved circuit whereby signals of relatively long duration or intensity may be differentiated to produce a pair of peaked signals of opposite polarity and of relatively short duration, and one of such peaked signals is eliminated in a novel manner.

Another specific object of the present invention is to provide an improved radar receiver in which the video detected by the detector is subjected to a fast time constant circuit, the time constant of which is equal substantially to a fraction of the duration of the desired echo signal so that other signals of relatively long duration or relatively high intensity in relationship to that of the desired echo are differentiated to transform the same into pairs of peaked signals of opposite polarity and each of substantially the same time duration as the desired echo signal, and in which means are provided to eliminate that produced peaked signal which has the opposite polarity as the desired echo signal.

Another specific object of the present invention is to provide an improved clipping circuit which incorporates a unidirectional conducting device for eliminating or clipping undesired pulses of predetermined polarity, the circuit, in accordance with the present invention, embodying features whereby the forward impedance of such unidirectional conducting device is lowered to produce a "harder" clamping effect and to provide a better impedance match with the source of pulses transferred to such device.

The features of the present invention which are believed to be novel are set forth with particularity in the appended claims. This invention itself, both as to its organization and manner of operation, together with further objects and advantages thereof, may be best understood by reference to the following description taken in connection with the accompanying drawings in which:

Figure 1 shows in schematic block diagram form a radar receiver embodying features of the present invention;

Figure 2 shows in more detail the circuitry of the detector and FTC (fast time constant) stages in Figure 1 and shows also the manner in which the FTC stage is coupled to the first video amplifier stage;

Figures 3A, 3B and 3C are helpful in illustrating one of the results of the present invention; and Figure 4 shows an FTC stage associated with a novel clipping circuit also embodying features of the present invention.

Referring to Figures 1 and 2, both desired radar echo signals 29 and undesired sporadic signals 39, "rain" or "cloud" clutter, as well as large intensity signals from mountains and the like, are received in the form of a carrier wave on antenna 10 and mixed in mixer stage 11 with a signal of constant frequency developed in the local oscillator stage 12, to thereby produce, by a superheterodyne action, a wave of intermediate frequency which is amplified in the I. F. amplifier stage 13, detected in the detector stage 14 and the resulting video, including such signal 29 and 39, after being subjected to the fast time constant circuit 15, is amplified in the video amplifier 16 and then applied to a cathode ray indicator 17.

The detector 14 as shown in Figure 2 comprises a conventional diode rectifier 20 having its cathode 21 grounded through the self-resonant coil 23 which is tuned at the midfrequency of the intermediate frequency wave and receives a signal from the I. F. amplifier 13 through the coupling condenser 24. The anode 25 is connected to the ungrounded terminal of the load resistance 26 by way of a filter network 27, 28, so that the unidirectional voltage 29, corresponding to the received desired echo signals or pulses, as well as the sporadic signals of longer duration or large intensity signals, as, for example, from mountains, and represented by the unidirectional voltage 39, appear recurrently across the resistor 26. This filter network 27, 28 comprises a choke coil 27 connected between the anode 25 and the ungrounded terminal of resistance 26 and a bypass condenser 28 connected between the anode 25 and ground.

The series of voltage pulses 29 and 39 may be applied, depending upon the position of the single pole double throw switch 30, either directly to the control grid 31 of the video amplifier discharge device 32 through the coupling condenser 33, or indirectly to such control grid 31 through the FTC circuit, depending upon the position of the movable switch arm 30A. It is assumed hereafter that the switch arm 30A contacts the switch element 30B, in which case the voltages appearing across the load resistance 26 is applied across a series circuit of predetermined time constant comprising the condenser 35 and resistor 36. The time constant of this series circuit 35, 36 is preferably such that it is one half, or less than one half, of the width of the pulse 29, which corresponds to the received desired echo. For example, the condenser 35 may be 50 micro-microfarads and the resistance 36 may be 15,000 ohms to produce a differentiating time constant of 0.75 microsecond, which is adequate when the transmitted pulse is of 1.5 to 2.0 microseconds duration.

The desired voltage pulses 29, received as echoes from the target, are, of course, of predetermined time duration approximating that of the transmitted pulse. Each echo occurs at a predetermined repetition rate as established by the radar transmitter. However, the voltage pulses 39, which may correspond to either the undesired sporadic signals or to large intensity signals, as for example, from mountains, may occur with both duration and "phase" at random with respect to the occurrence of the voltage waves 29. The video voltage appearing across resistance 26 may thus take different forms, several of which are illustrated in Figures 3A, 3B and 3C, which describe different phase reactions of desired signal 29 and undesired signal 39.

Referring to Figure 3A, and assuming linear response of all amplifiers preceding the FTC circuit, the lower illustration in full lines represents the voltage wave 39, and the dotted portion 29E superposed thereon represents the contribution due to the echo pulse 29. The lower diagrams in Figures 3B and 3C represent in similar form the voltage pulse 39 and the contribution 29E due to the echo pulse 29 when the echo pulse 29 appears contemporaneously with the trailing and leading edge of the voltage wave 39, respectively. Figure 3A corresponds to the condition when the echo pulse 29 occurs between the leading and trailing edges of the wave 39.

As mentioned previously, the voltage wave 39, because of its long duration, may cause the electron beam in the indicator 17 to be intensified unduly long, and thereby to obscure the effect produced by the desired echo signals represented by the voltage wave 29. For that reason, the voltage wave 39 is differentiated by the differentiating circuit 35, 36 to break up the long wave 39 into two relatively short peaked pulses 39A, 39B of opposite polarity, as indicated in Figure 3A, wherein the upper and lower diagrams have the identical time base. Similarly, the contribution 29E, in the form of a rectangle, is likewise differentiated to produce the negative peaked voltage wave 29F and the positive peaked voltage wave 29G, so that the voltage wave appearing in the upper half of Figure 3A represents that voltage which appears across the resistance 36 under the specified conditions. If this condition represented in Figure 3A continued, i. e., if the relative phase between the voltages 29 and 39 remained as indicated in Figure 3A, then the results obtained are satisfactory without a clipping circuit as described hereinafter in connection with device 41.

Because of the spacing between the peaks 39A and 29G, their individual effects on the cathode ray tube are discernible, particularly when the switch arm 30A is moved to engage successively its two associated stationary contacts. However, in some instances, as represented by the conditions existing in Figure 3B, the fall of undesired voltage 39 and the rise of desired voltage 29 occur substantially simultaneously to produce a voltage pulse 29H which is smaller than normal. It is apparent that the pulse 29H is in part diminished by the decay of pulse 39B, which acts to obscure the desired signal 29. The pulse 29F is the pulse used in intensifying the electron beam. Diminishing of its amplitude, as in the case when the conditions of Figure 3B exist, is undesirable. It is noted that the amplitude of this signal 29H is small because the negative voltage peak 29F is counteracted by the decay of the positive voltage peak 39B. In order to avoid the conditions existing in Figure 3B, the positive voltage peaks 39B are eliminated or clipped, by means of a unidirectional conducting device such as is represented by the diode 41 connected in shunt with the resistance 36. Similarly, the diode 41 also clips the positive peaked voltage 29G.

It is observed that clipping provided by diode 41 does not remove the peaked voltage wave 39A. The presence of voltage peak 39A is tolerable since it always acts in the same direction as the useful peaked voltage wave 29F.

It is observed further that by providing the differentiating network 35, 36, the received echo wave 29 is effectively shortened, as is evident from the fact that the duration of the peaked voltage wave 29F is substantially less than the duration of the echo voltage wave 29. This peaked voltage wave 29F is applied to the control grid 31 of device 32 to produce an image on the cathode ray tube of shorter duration than would otherwise exist.

Bias for such control grid 31 may be supplied by providing a relatively fixed bias voltage established by the resistance 42 and shunt connected condenser 43 between the cathode of device 32 and ground. The negative voltage peak 29F thus appears in amplified form and with reversed polarity at the anode of the video amplifier 32, as represented by the positive voltage peak 29K. It is this positive voltage peak 29K which is further amplified in the video amplifier stage 16 and applied by way of a cathode follower stage to the cathode circuit of the cathode ray tube in the indicator 17.

While the clipping circuit incorporating the diode 41 may be used to obtain the aforementioned results, we prefer to use the circuit shown in Figure 4 wherein corresponding parts have identical reference numerals.

In Figure 4 the differentiating network 35, 36 functions as described above, and the unidirectional conducting device, represented in this instance as a germanium crystal 41A, corresponding to the diode 41, is not returned to ground but has one of its terminals connected to the anode 46 of device 32 through the condenser 47. In other words, there is a negative, i. e., degenerative feedback condition between the anode 46 and the control grid 31.

It is observed that all crystals and diodes have a finite impedance in their so-called forward direction, i. e., in their conducting direction, and that their effectiveness as a clipper depends on the relation of such impedance to the impedance of the source supplying the signals which are being clipped. The output circuit of the detector stage 14 supplying the signals to the diode 41 or crystal 41A, as the case may be, has a relatively small impedance. It is desirable that the impedance of such devices 41 and 41A be also small in the conducting direction of the diode or crystal. If the impedance of device 41 is not small with respect to the output impedance of the detector, in addition to the desired pulse 29K, corresponding to pulse 29F, the anode 46 may have the undesired voltage peak 39M, corresponding to pulse 39B, as shown in Figure 4. The reduction of the amplitude of voltage wave 39M is desirable and is accomplished by means of the feedback connection which includes the condenser 47.

A feature of the circuit shown in Figure 4 is that the feedback connection, which includes the condenser 47, serves effectively to reduce such impedance or resistance of the crystal 41A, since a signal of reverse amplitude appears at the lower terminal of the crystal. It is observed that the positive voltage peak 29K is likewise fed back; however, the crystal impedance is much higher for this pulse, and only a small reduction in its amplitude is observed.

Referring to the Figure 4 I prefer to connect a high impedance resistance 41B in shunt with the clipping diode 41A to provide a direct current return for the crystal, although under certain circumstances, particularly when the crystal 41A has a low back resistance as compared to the resistance of a vacuum tube type of diode, the resistor 41B need not be used.

While the particular embodiments of the present invention have been shown and described, it will be obvious to those skilled in the art that changes and modifications may be made without departing from this invention in its broader aspects and, therefore, the aim in the appended claims is to cover all such changes and modifications as fall within the true spirit and scope of this invention.

I claim:

1. Radar apparatus of the character described, for receiving reflected echo signals and for displaying such echo signals on a cathode ray tube indicator without appreciable interference from clutter signals which endure for a substantially longer duration than said echo signals, the combination comprising a detector stage including a rectifier, an output load resistance, coupled to said detector for developing both echo and clutter signals, a differentiating network connected in shunt with said load resistance, said differentiating network comprising a serially connected condenser and a second resistance having a time constant one-half or less than one-half of the width of said echo signal, a cathode ray tube indicator, and means coupling said second resistance to said cathode ray tube indicator, said coupling means comprising: a tube having a control grid and a cathode and an output electrode, said second resistance being connected between said cathode and said control grid, a degenerative connection between said output electrode and said control grid, said degenerative connection comprising a serially connected condenser and unidirectional conducting device.

2. The arrangement set forth in claim 1, in which a resistance is connected in shunt with said unidirectional conducting device.

3. Radar apparatus of the character described, for receiving reflected echo signals and for displaying such echo signals on a cathode ray tube indicator without appreciable interference from clutter signals which endure for a substantially longer duration than said echo signals, the combination comprising a detector stage including a rectifier, an output load resistance, coupled to said detector for developing both echo and clutter signals, a differentiating network connected in shunt with said load resistance, said differentiating network comprising a serially connected condenser and a second resistance having a time constant one-half or less than one-half of the width of said echo signal, a cathode ray tube indicator, and means coupling said second resistance to said cathode ray tube indicator, said second resistance having one of its terminals grounded, said coupling means comprising a tube having a cathode, a control grid and an output electrode, a biasing resistance connecting said cathode to ground, a by-pass condenser connected in shunt with said biasing resistance, a degenerative connection between said output electrode and said control grid, said degenerative connection comprising a serially connected condenser and unidirectional conducting device.

4. The arrangement set forth in claim 3, in which a resistance is connected in shunt with said unidirectional conducting device.

5. Radar apparatus of the character described, for receiving reflected echo signals and for displaying such echo signals on a cathode ray tube indicator without appreciable interference from clutter signals which endure for a substantially longer duration than said echo signals, the combination comprising a detector stage including a rectifier, an output load resistance, coupled to said detector for developing both echo and clutter signals, a differentiating network connected in shunt with said load resistance, said differentiating network comprising a serially connected condenser and a second resistance having a time constant one-half or less than one-half of the width of said echo signal, a cathode ray tube indicator, and means coupling said second resistance to said cathode ray tube indicator, said coupling means comprising a tube having a cathode, a control grid and an output electrode, said second resistance being connected between said control grid and said cathode, means for coupling the peaked signals developed across said second resistance which have a predetermined polarity, said clipping means comprising a degenerative connection between said output electrode and said control grid, said degenerative connection comprising a serially connected condenser and a unidirectional conducting device.

6. The arrangement set forth in claim 5, in which a resistance is connected in shunt with said unidirectional conducting device.

References Cited in the file of this patent

UNITED STATES PATENTS

| Number | Name | Date |
| --- | --- | --- |
| 2,113,214 | Luck | Apr. 5, 1938 |
| 2,157,677 | Runge | May 9, 1939 |
| 2,223,995 | Kotowski | Dec. 3, 1940 |
| 2,251,973 | Beale | Aug. 12, 1941 |
| 2,308,375 | Loughren | Jan. 12, 1943 |
| 2,356,140 | Applegarth | Aug. 22, 1944 |
| 2,426,184 | Deloraine et al. | Aug. 26, 1947 |
| 2,436,891 | Higginbotham | Mar. 2, 1948 |
| 2,525,634 | Atwood et al. | Oct. 10, 1950 |
| 2,597,353 | MacNichol | May 20, 1952 |
| 2,619,590 | Williams | Nov. 25, 1952 |

OTHER REFERENCES

An Anti-Clutter Radar Receiver, Alred and Reiss, Jour. of Inst. of Elect. Eng., vol. 95, part III, No. 38, of November 1948, pages 459 to 465.